United States Patent
Crandall et al.

(10) Patent No.: US 7,141,261 B2
(45) Date of Patent: Nov. 28, 2006

(54) PRODUCTION OF PECTIN FROM SOYBEANS

(75) Inventors: Philip G. Crandall, Fayetteville, AR (US); Anna M. McCain, Goshen, AR (US)

(73) Assignee: Soy Pectin, Fayetteville, AR (US)

(*) Notice: Subject to any disclaimer, the term of this patent is extended or adjusted under 35 U.S.C. 154(b) by 34 days.

(21) Appl. No.: 10/781,115

(22) Filed: Feb. 18, 2004

(65) Prior Publication Data

US 2004/0166226 A1 Aug. 26, 2004

Related U.S. Application Data

(62) Division of application No. 09/721,105, filed on Nov. 22, 2000, now Pat. No. 6,787,177.

(60) Provisional application No. 60/212,153, filed on Jun. 16, 2000, provisional application No. 60/166,773, filed on Nov. 22, 1999.

(51) Int. Cl.
*A23L 1/20* (2006.01)

(52) U.S. Cl. ............... 426/431; 426/634; 426/658; 426/577

(58) Field of Classification Search ........... 426/634, 426/658, 577, 431
See application file for complete search history.

(56) References Cited

U.S. PATENT DOCUMENTS

| 3,160,569 | A | * | 12/1964 | Toyama | 435/264 |
| 4,119,733 | A | * | 10/1978 | Hsieh et al. | 426/46 |
| 4,478,939 | A | * | 10/1984 | Adler-Nissen et al. | 435/200 |
| 5,866,192 | A | * | 2/1999 | Uesugi et al. | 426/634 |
| 5,955,134 | A | * | 9/1999 | Nishimura et al. | 426/489 |

OTHER PUBLICATIONS

XP001000099, Sep. 15, 1998, Article entitled, "Preparation of Soy Hull Pectin", in Food Chemistry, by Ravin Gnanasambandam and A. Proctor.
XP004062712, Aug. 1, 1996, Article entitled, "Extraction and Purification of Pectic Polysaccharides From Soybean Okara and Enzymatic Analysis of Their Structures", by F. Yamaguchi, Y. Ota and C. Hatanaka.
XP000071861, Jan. 24, 1989, Article entitled, "Industrial Pectins: Sources, Production and Applications", by Colin D. May.

* cited by examiner

Primary Examiner—Anthony Weier
(74) Attorney, Agent, or Firm—R W Strozier

(57) ABSTRACT

A novel process for extracting pectin from waste hull/hypocotyl streams during soybean processing is shown. Chemical extracting agents in addition to or in conjunction with heat and agitation are used to extract pectin from the waste streams. The pectin is then precipitated in alcohol, washed and dried. A process for whitening the extracted pectin is also shown.

21 Claims, 4 Drawing Sheets

PRODUCTION OF PECTIN FROM SOYBEANS

RELATED APPLICATIONS

This application is a divisional of U.S. patent application Ser. No. 09/721,105 filed 22 Nov. 2000, now U.S. Pat. No. 6,787,177 and claims provisional priority to U.S. Provisional Application Ser. Nos: 60/166,773, filed 22 Nov. 1999 and 60/212,153, filed 16 Jun. 2000.

BACKGROUND OF THE INVENTION

1. Field of the Invention

The present invention relates to a novel process to extract pectin from a waste hull/hypocotyl stream during soybean processing and to a whitened form of soy pectin.

More particularly, the present invention relates to a novel process to extract pectin from waste soybean hull/hypocotyl streams using a chemical extraction agent in addition to heat and agitation followed by precipitation in alcohol, drying and whitening and to a whitened soy pectin product.

2. Description of the Related Art

US farmers produce about half of the 140 million metric tons of soybeans produced worldwide each year (Klugh 1997, Am. Soybean Assoc. 1998). All but 1 million metric tons are oil type beans that are crushed and made into soybean oil for human food products or soybean oil as an industrial feed stock. The defatted soybean meal is used mainly for animal feed. Oil soybeans are composed of about 90% cotyledons, 8% hulls and 2% hypocotyls. Soybean hulls and about 40% of the hypocotyls are sold separately for $0.07 to $0.08/kg and are referred to as soy "mill run" for use as animal feed. Mill run is about 95% hulls that are composed mostly of alpha cellulose and hemicellulose; they contain about 9% protein and are low in lignin. The digestible energy of soy hulls is essentially equal to grains for ruminant animals (Liu 1997). The soy hull pectins of this invention are suitable as a dietary fiber source, i.e., as a dietary supplement or a food additive.

Dietary fiber plays a strong supporting role in many nutraceutical foods where the fiber works in combination with health promoting ingredients such as nutraceuticals and antioxidants (Pszczola 1998). Glore, et al. 1994, reviewed the effects of pectin and other soluble dietary fibers on serum lipids and reported that in 88% of the 77 human studies, soluble fiber significantly lowered total serum cholesterol (TC). Of the studies that reported on the effect of a specific food or type of soluble fiber, beans and legumes reduced TC in 100% (10/10) and pectin reduced TC in 71% (10/14) of these studies. Hunninghake et al. 1994 and Kumar et al. 1997 found similar results. Judd and Truswell 1982 compared the effects of high methoxyl pectin with a degree of esterification (DE) of 71%, to low methoxyl pectin, DE 37%, and found both almost equally effective in lowering TC in humans. In 1980 Jeltema and Zabik reported on the pectin content of soybean hulls. In the water-soluble fraction they found about 0.5% pectin and 0.4% hemicellulose and in the water-insoluble fraction they found 7% pectin, 36% cellulose, 18% hemicellulose and 3% lignin. Gnanasambandam and Proctor 1999 reported on the X-ray diffraction and infrared spectra of laboratory extracted pectins. The specific cholesterol lowering ability of soybean pectin has yet to be established.

Soy, together with several other types of fiber, is being used in a wide variety of nutraceutical food products. Nutraceutical drinks and high fiber instant noodles use soy fiber to reduce fat and increase the health benefits from high dietary fiber levels (Pszczola 1998). A considerable amount of research done on the chemical analysis of pea hulls demonstrated that pea hulls alcohol insoluble residue (AIR) was 94% carbohydrate including 4 to 6% pectinaceous material (Weightman, et al. 1994). Functional properties of the AIR showed high cation exchange capacity and significant water holding and swelling capacities. Dalev and Simeonova, 1995 combined positively charged proteins below their isoelectric point with anionic pectin to produce stable, low oil emulsions for creams and mayonnaises with a high dietary fiber content. Low-methoxyl pectins have been studied as potential moisture barriers in edible coatings (Kester and Fennema 1986) and as low-calorie fat-replacers with improved mouthfeel in salad dressings, frozen deserts and baked goods (Glicksman 1991).

Most commercial pectin is extracted from citrus peel recovered after the juicing operation. Heat and mineral acids are used to solubilize the pectin and either alcohols or aluminum salts are generally used for precipitin. Commercial pectin is also extracted from apple pomace in a similar manner (May 1990). Both citrus peel and apple pomace are high in moisture and are typically dried within a few hours after the juicing operation to prevent attack by moulds and native pectic enzymes. There is an accompanying loss in pectin yield with drying, 15% to 30% for lemon peel (Crandall, et al 1978). A dry starting material like soy hulls and hypocotyls would be stable for long periods of time and not have the expense of needing to be dried, a distinct advantage.

Thus, there is a need in the art for pectins derived from other sources and especially pectins with improved color using a low value starting material such as soybeans and equipment that can be incorporated into existing soybean processing plants.

SUMMARY OF THE INVENTION

The present invention provides a soybean derived pectin having enhanced whiteness.

The present invention also provides a soy pectin material comprising about 40 wt. % of anhydrous galacturonic acid and about 8 wt. % protein.

The present invention also provides a food stuff for animals including humans comprising the soy pectin of this invention.

The present invention also provides a method for extracting soy pectin from soybeans during soybean processing involving acidification of waste soybean hull/hypocotyl streams at an elevated temperature under agitation followed by alcohol precipitation and drying. Optionally, the method can include water and additional alcohol washing steps.

The present invention further provides a method for improving the whiteness of soy pectin involving slowly evaporating the alcohol from the precipitated soy pectin over a period of time sufficient to enhance the whiteness, preferably the period is at least one hour and particularly at least 2 hours and especially at least 3 hours.

The present invention also provides a method for producing soy pectin comprising the steps of: extracting a soybean hull/hypocotyl mixture in a mineral acid at an elevated temperature and for a time and at a pH sufficient to extract a pectinaceous soy material from the mixture; cooling the extracted pectinaceous material and raising the pH; separating the extract from the solid residue; precipitating the pectinaceous material in an alcohol; and drying the pectinaceous material to form soy pectin.

DETAILED DESCRIPTION OF THE INVENTION

Figure 1:
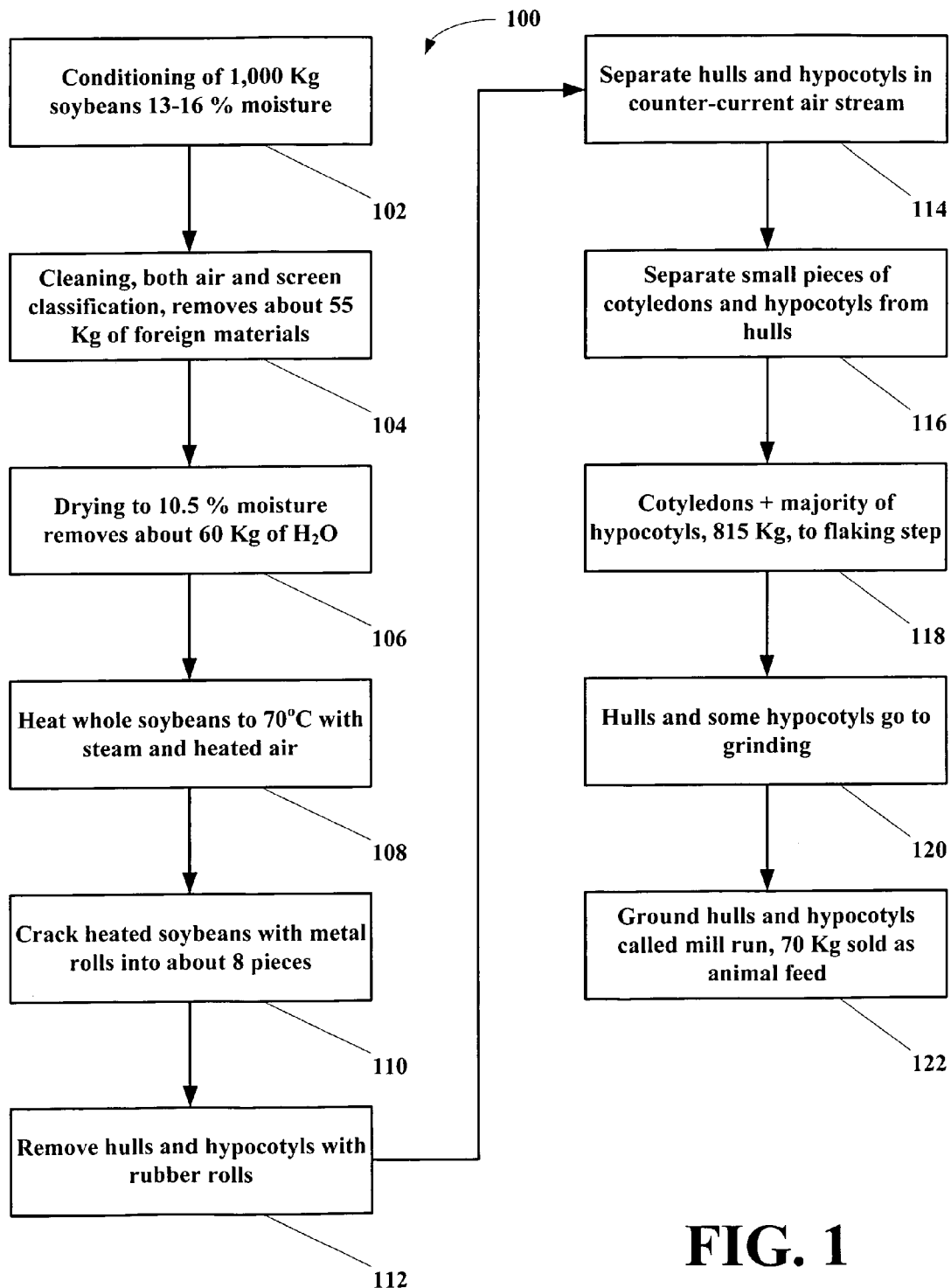
FIG. 1 depicts a typical commercial soybean processing plant flow diagram showing hot de-hulling and separation of hulls and hypocotyls.

The inventors have found that pectin can be extracted from waste hull/hypocotyl streams from soybean processing. Chemical extracting agents such as minerals acids, alkali bases and enzymes in addition to or in conjunction with to heat and agitation are used to extract pectin from soyben hull/hypocotyl waste stream. The extracted pectin can then be precipitated in alcohol, dried and evaluated. The process uses a low value starting material to produce pectin. Pectin is a valuable commodity in the food industry and most pectin is currently imported into the United States. Also, the process has been developed using materials and equipment that can be incorporated into existing soybean processing plants.

Soy pectin may be a low cost substitute for citrus and apple pectin in the manufacture of jams, jellies, candies, fat replacers and pharmaceuticals. Pectin may also possess phytochemical properties such as the reduction of hypercholesterolemia (high cholesterol) and pectin has many uses as a food additive.

The inventors have found that a soy pectin can be prepared that has a lightness index above about 85 L, preferably above about 87 L and particularly above about 90 L. The lightness index is a scaled index depicting the darkness or lightness of the product. The index start with a value of zero being black to a value of 100 being white. Further details about the index can be found in Norman Potter and Joseph Hotchkiss, 1995, "Food Science" 5$^{th}$ edition, Chapman and Hall Publishing, NY, N.Y., pages 93–95, incorporated herein by reference.

Pre-wash Unit Operation

Extraction of pectin from samples of soybean hulls and hypocotyls with mineral acids was initially not successful. The dried pectin was colored dark brown, brittle, very hard and resistant to re-solubilization after being dried under vacuum. It was determined that using a pre-wash step before extracting the soy hulls and hypocotyls had a beneficial effect on the purity of the finished product. This pre-wash step removed soluble hemicellulose and other soluble compounds that interfered with the extraction of the pectin. Mass balance showed that about 15% of the dry weight of the starting materials was removed during the wash step.

During the wash temperature study at 20° C., 50° C., 60° C., 70° C. and 90° C., the yield of pectin decreased significantly as the pre-wash water temperatures were increased above 20° C. as shown in Table 1.

TABLE 1

Comparison of Wash Temperatures Using Turbidity of the Leach Water, % Yield of Pectin and % Purity of Pectin

| Wash Temp. | % T First Wash | % T Second Wash | % Yield of pectin | % Purity as UA |
|---|---|---|---|---|
| 20° C. | 8.7 ± 1.1 | 36.8 ± 0.9 | 8.1 ± 0.7 | 26 ± 4 |
| 50° C. | 7.2 ± 0.8 | 31.9 ± 1.1 | 4.7 ± 0.4 | 27 ± 4 |
| 60° C. | 7.4 ± 0.7 | 32.6 ± 4.5 | 5.4 ± 1.1 | 30 ± 4 |
| 70° C. | 8.8 ± 1.1 | 43.6 ± 3.9 | 4.6 ± 0.0 | 38 ± 4 |
| 90° C. | 7.4 ± 0.8 | 40.4 ± 4.9 | 4.6 ± 0.1 | 42 ± 4 |

UA = galacturonic acid

Two, 10-minute ambient temperature, 20° C., pre-washes were found to be adequate to remove interfering soluble compounds for an increase in pectin quality and purity without an extensive reduction in the yield of pectin.

Soaking Unit Operation

The purpose of soaking was to expand the cellular network and facilitate pectin extraction to increase the yield. Soaking the hulls and hypocotyls at room temperature at a pH of 2.0–2.4 for 18 hours was compared to soaking for 7 days. There was no significant difference between soaking for 18 hours yield, 9.8±0.9%, when compared to soaking for seven days, 9.4±0.5% yield. This indicated that for the proposed pectin extraction conditions, soak times longer than 18 hours did not release a greater amount of pectinaceous materials from the cellular matrix. Longer presoaking times also produced a darker-colored pectin. Data not shown.

The pH range of 2.0–2.4 was chosen based on information obtained from a 1938 patent by Olsen and Stuewer. This pH loosened the cellular matrix without damaging the pectinaceous material and minimized increases in the microbial load. Soaking of starting materials prior to pectin extraction has been used to a limited extent commercially. It was used to store fresh lime and lemon peel to prevent rapid degradation of pectin by native endopolygalacturonase enzymes. Soaking at a reduced pH also helped soften the citrus peel and prevent microbial degradation (Ehrlich, 1998).

Small Scale Pilot Plant Extractions

Figure 2:
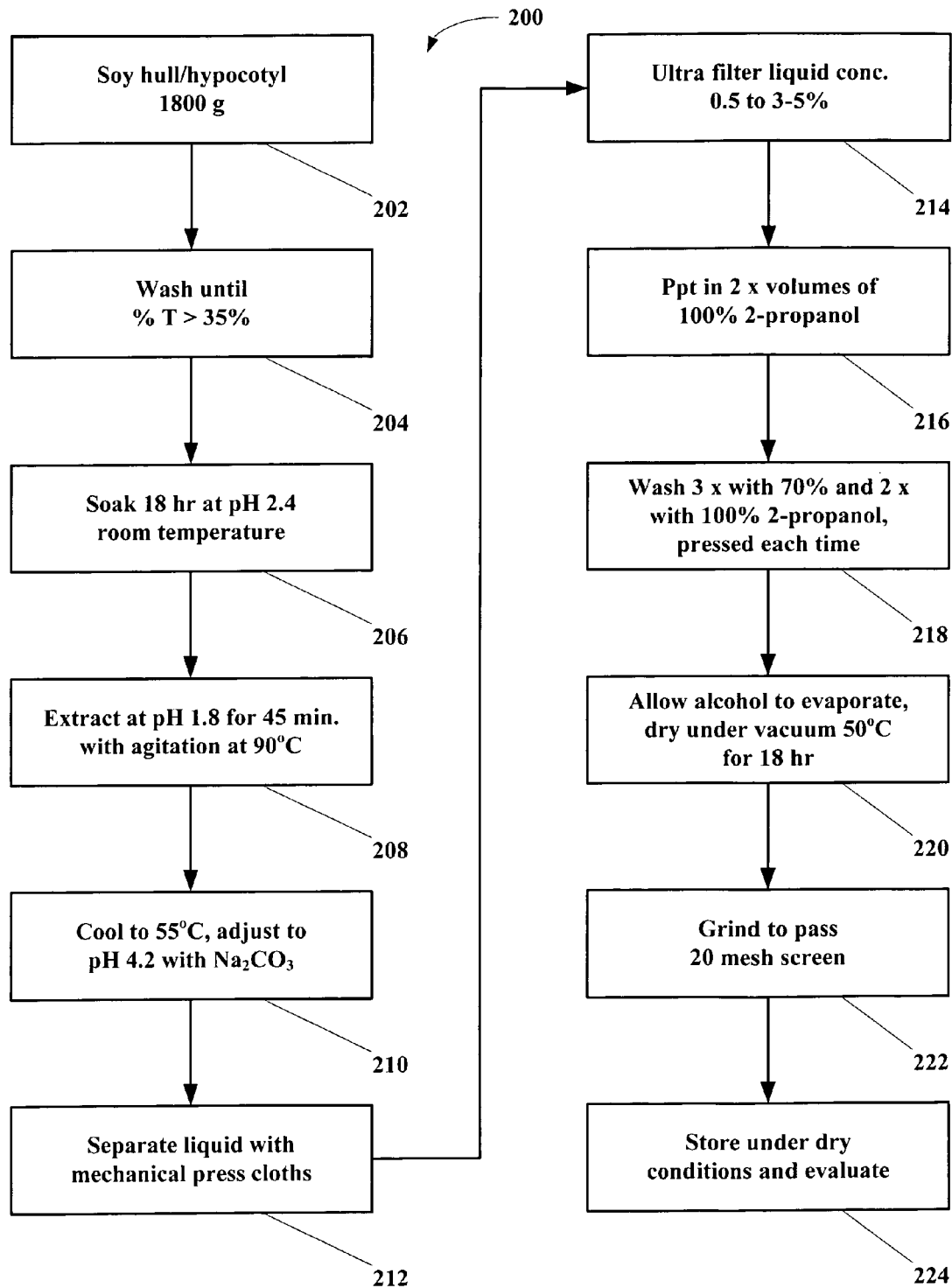
FIG. 2 depicts a small pilot plant flow diagram showing washing, soaking, extraction and precipitation conditions.

The preliminary laboratory experiments were finalized and scaled up for small-scale extractions in the pilot plant as shown in FIG. 2. The pectinaceous material extracted in the small-scale, pilot plant operation and separated using press cloths gave a yield of 3.0%. The color of this sample was L*80.7+/−4.1, a*1.2+/−0.5, b*10.7+/−1.6. When compared to commercial lime pectin with a color of L*91.6, a*1.8, b*14.6, the soy pectinaceous material was found to be slightly darker in color. Typically pectin extracted from lime or lemon peel has a yield of about 30% and a purity greater than 65% (Crandall, et al. 1978). The minimum 65% purity as galacturonic acid is required by USP Standards. The inventors were unable to achieve a high methoxyl gel formation with the soy pectinaceous material using the excess acid in the glass method (IFT 1959) with this particular preferred extract. Thus, the soybean pectin product is different from traditional citrus pectin and acts more as a thickener than a gelling agent.

50 g from the third small-scale pilot plant extraction was analyzed for its chemical constituents and the results are shown in Table 2.

TABLE 2

Analysis of Pectic Polysaccharide from Soybeans

| | |
|---|---|
| Purity as AGA* | 41.3% |
| Xylose + mannose | 16.0% |
| Galactose | 7.6% |
| Rhamnose | 1.4% |
| Glucose | 4.3% |
| Arabinose | 2.5% |
| Fucose | 1.2% |
| Cellulose | 0.6% |
| Protein | 7.9% |
| (N * 6.25) | |
| Moisture | 2.3% |
| Total analyzed | 85.1% |

*Anhydrogalacturonic Acid (AGA)

These results indicate that the pectinaceous substances isolated from soybean hulls and hypocotyls are a pectin backbone composed of rharmnogalacturonic and xylogalacturonic acids. They had a galacturonic acid content of 41.3% and a xylose/mannose content of 16%. There were significant amounts of galactose and glucose and small amounts of rhamnose and arabanose. After extensive aqueous washing of the raw material, alcohol washing/precipitation and alcohol washing/pressing of the pectinaceous product, the loosely held sugars that were part of the physical matrix had been removed. Therefore, the remaining sugars must have been part of the pectinaceous molecules. These results are similar to the commercial SPS soy product reported on by Beldman et al. 1996 with a similar galacturonic acid and neutral sugars content for galactose and arabinose from a soluble 'hairy' pectic polysaccharide of soy (Adler-Nissen et al. 1984).

The soy pectinaceous material extracted under the conditions described in FIG. 2 had a degree of esterification (DE) of 29.6% with a methoxyl content of 1.67% indicating a low methoxyl (LM) pectin. Weightman, et al 1994 and 1995, found the alcohol insoluble residue (AIR) from another legume, pea hulls, also had a low degree of methylation.

There was a fairly high degree of acetylation, 27.2%, of the acid extracted soy pectinaceous material. The total acetyl content of 2.1%. The average molecular weight of the soy pectinaceous material was approximately 21 kD. Only 85% of this soy pectinaceous sample was soluble including about 8% that was protein. The remaining insoluble portion was assumed mostly to be insoluble cellulose and hemicellulose.

Large Scale Pilot Plant Extractions

Figure 4:
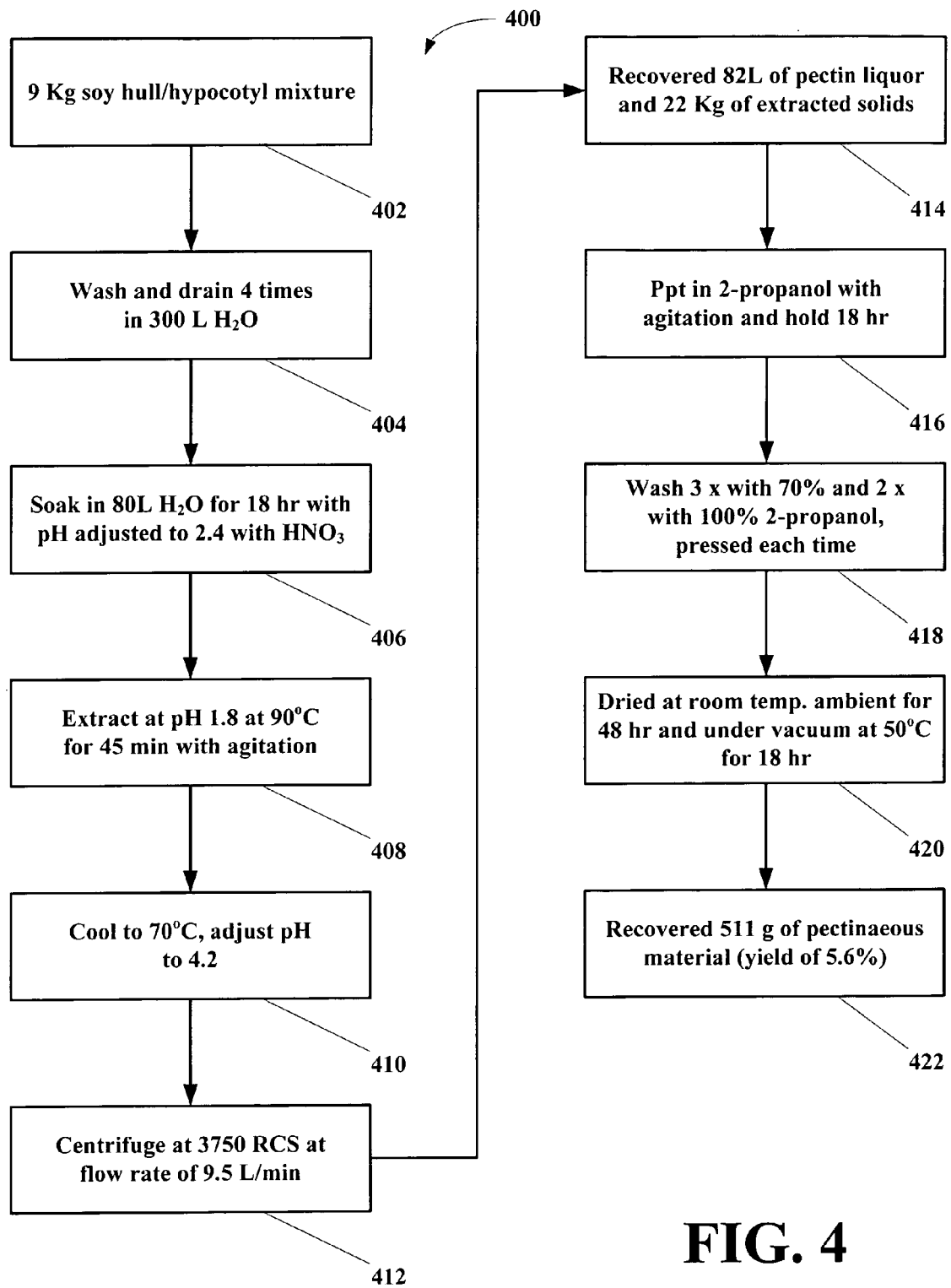
FIG. 4 depicts a large pilot plant flow diagram giving material balance and yields of pectin from commercial soybean hull and hypocotyl mixture.

The goal of the large-scale tests was to produce several hundred grams of pectinaceous material from soy mill run for commercial evaluations. This amount of product required three or four large-scale pilot plant runs and a centrifuge for the separation of the spent hulls from the pectin liquor. The solid bowl centrifuge was able to separate the extracted pectin suspension with feed solids of about 40% solids and reduce it to less than 6% solids in the centrifuged pectin liquor. FIG. 4 shows the overall process and material balance values from one of the large scale, pilot plant runs. From 9 kg of the commercial soy hull and hypocotyl mixture, the process of this invention extracted approximately 500 g of pectin with a yield of 5.6% and an UA of 37%.

Limited application studies of the soy pectinaceous material at Danisco-Cultor showed it had thickening capabilities in a milk-based drink. One negative aspect for the milk-based drink was a protein precipitating capacity. The inventors anticipate that the soy pectinaceous material of this invention will be a suitable for many uses in the food industry.

Traditionally, soy hulls and hypocotyls are fed to ruminants as an energy source when the ruminants are on a cool season forage. The feed analysis on a composite sample from the large scale run before and after acid extraction showed there were no major differences in the digestibility of the feed before and after acid extraction of the pectin. Therefore, it was important in completing this feasibility study of the pectin extraction process to measure the differences in the feeding value before and after extraction. Results from the feed analysis estimated the energy content in the soy hulls before and after extraction as shown in Table 3.

TABLE 3

Feed Analysis of Composite Sample of Soy Hull and Hypocotyl Before and After Acid Extraction of Pectin

Dry Matter Basis

| | % Moisture | % Dry Matter | % Ash | % Crude Protein | % Neutral Detergent Fiber | % Acid Detergent Fiber | % Acid Detergent Lignin | % Hemi-Cellulose | % Cellulose | In Vitro Digestibility % IVDMD | (Tannin) [Catechin equivalent/ g sample] |
|---|---|---|---|---|---|---|---|---|---|---|---|
| Before Extraction | NA | 93.00 | 4.99 | 13.67 | 77.12 | 51.07 | 2.16 | 26.05 | 48.75 | 84.04 | 0.02 |
| After Extraction | 72.46 | 92.20 | 3.20 | 12.91 | 68.01 | 66.54 | 2.78 | 1.47 | 63.57 | 78.14 | 0.04 |

Dry Matter Basis

| | Na (mg/kg) | S (%) | K (%) | Mn (mg/kg) | Fe (mg/kg) | Cu (mg/kg) | Zn (mg/kg) | Al (mg/kg) | Ca (%) | Mg (G) | P (%) |
|---|---|---|---|---|---|---|---|---|---|---|---|
| Before Extraction | 622.63 | 0.07 | 1.42 | 48.56 | 870.53 | 9.48 | 67.67 | 567.42 | 0.61 | 0.26 | 0.14 |
| After Extraction | 3488.08 | 0.06 | 0.16 | 30.25 | 434.45 | 7.76 | 48.58 | 142.71 | 0.62 | 0.13 | 0.08 |

The crude protein dropped less than 1% but is still adequate at almost 13%. The NDF and hemicellulose reflect the acid extraction conditions that led to a higher percentage of cellulose in the extracted sample. Both the lignin (ADL) and tannin were low in these samples. The digestibility, % IVDMD, is excellent at about 80% compared to alfalfa at 70 to 72%. Typical coefficients of variation are less than 2% using these feed analysis techniques. The soy hulls and hypocotyls after extraction are still a good source of energy for ruminants. The moisture in the extracted mill run, about 70%, is similar to green corn and has potential for use in silage. The hot, nitric acid extraction removed about 1.8% of the ash and can be seen as a general decrease in most of the minerals. Thus, soy hull and hypocotyl, that have had the pectin extracted, will still be useful as a feed that is used principally as an energy source despite a decrease in mineral content.

The pectinaceous material extracted from soybean hulls and hypocotyls is useful in all applications where other pectins are useful. The use of soluble fiber and mixtures of soluble and insoluble fiber in food products is growing rapidly (Andersson 1994, Garcia, et al. 1991, Thestrup 1993, Yamaguchi, et al. 1994). The inventors have proved that the major portion of pectinaceous materials from the soy hulls is extractable and a viable commerce product is formed. Quantitative extraction of dietary fiber components from soy has already been published (Jeltema and Zabik 1980).

The fact that the soy pectinaceous material is different from citrus pectin has several advantages. The citrus industry has a long-standing market share using pectin as a food ingredient and a new, similar product would have difficulty competing. One of the limitations of citrus pectin as a nutraceutical is the formation of strong gels at low concentrations (Yamaguchi, et al. 1994). Lower molecular weight and low methoxyl pectins are being prepared from high molecular weight and high methoxyl pectins for nutraceutical and functional purposes (Yamaguchi, et al. 1994, Thestrup 1993). The soy pectinaceous material is extracted with a low molecular weight and a low methoxyl content and may be more economically feasible as a functional and/or nutraceutical food additive. If the soy pectinaceous material is found to have health benefits, such as a cholesterol lowering ability, it can be added to foods in relatively large quantities without changing the textural properties of the foods too greatly. With 70 million metric tons of soybeans produced in the US each year and 8% of this amount is low-value mill run containing 6% pectinaceous material, there is a potential production of more than 100 thousand tons annually. The inventors have shown that soy mil run can still by used as a cattle feed after pectin extraction and could increase the profits to soybean growers and processors.

EXAMPLES

Materials

Commercial samples of a soybean hull and hypocotyl mixture were obtained from a soybean processing line of a major soybean processor in Stuttgart, A R. All chemicals (nitric acid, sodium hydroxide, 2-propanol, m-phenylphenol) were purchased from Fisher Scientific, Pittsburgh, Pa.).

Methods

Phase 1: Laboratory-Scale Experiments

Soy hulls and hypocotyls were collected from a commercial soybean processing plant after hot de-hulling and an initial separation of the hulls from the broken pieces of cotyledon. The starting materials for this experiment, a commercially available hull and hypocotyl mixture, was mixed and randomly assigned to sub-samples. A series of preliminary experiments were designed to adapt citrus pectin preparation and extraction procedures to the extraction of pectinaceous materials from soybean hulls and hypocotyls. All experiments were done in duplicate.

Samples of soy hulls and hypocotyls were washed to determine the effects of wash water temperatures. The percent transmittance (% T) was measured on the wash solutions with a Coleman-Hatachi model 101 spectrophotometer (Maywood, Ill.). Separate experiments were conducted to increase the yield of pectin by soaking the washed hulls and hypocotyls to expand their cellular matrix. An 18-hour soak at ambient temperature was compared with a 7-day soak at pH 2.0–2.4 adjusted with nitric acid, an acid commonly used in commercial pectin extraction operations.

The following extraction conditions were optimized in the laboratory. 60 g of hulls and hypocotyls was washed twice with ambient temperature water with rapid stirring for 10 minutes. The dirty wash water was filtered from the hulls and hypocotyls. They were then soaked 18 hours in 1 L of ambient temperature water adjusted to pH 2.0–2.4 using nitric acid. After the wash and soak steps, the hull and hypocotyl mixture was extracted at 90° C. and pH 1.8 for 45 min with rapid stirring. After heating, the pH was readjusted to approximately pH 4.0 using sodium bicarbonate to minimize damage to the pectinaceous product. The pectin liquor was separated from the spent hulls by filtration and precipitated for 18 hours in 2× volumes of 100% 2-propanol before being filtered from solution. The pectinaceous material was rinsed twice in 70% 2-propanol and once in 100% 2-propanol before drying overnight at room temperature to evaporate the alcohol and under vacuum at 55° C. for 18 hours to evaporate the water. These preliminary lab-scale experiments set the conditions for the larger-scale pilot plant extractions.

The pectinaceous material from each of the extractions was characterized for % yield, color and purity. The color of the dried, ground pectin was measured on a Gardner/Pacific Scientific colorimeter (Model 05, Silver Springs, Mass.). The galacturonic acid (UA) content was measured by the m-hydroxydiphenyl method as modified by Kintner and VanBuren 1982 using a Coleman-Hitachi model 101 spectrophotometer.

Referring now to FIG. 1, an block diagram 100 for a preferred embodiment of a process of this invention is shown to includes a conditioning step 102 where the water content of a soybeans is reduced or increased to about 13 to about 16 percent. Higher and lower water percentages can be used as well. Next, the conditioned soybeans are cleaned using air and screen to remove foreign material in a cleaning step 104. After cleaning, the soybeans are dried to about 10.5% moisture content in a drying step 106. Next, the soybeans are heated to about 70° C. with heated air and/or steam in a heating step 108. After heating, the soybeans are mechanically cracked between two rollers into about 8 pieces in a cracking step 110. Next, the hulls and hypocotyls are removed from the pieces with rubber rolls or other mechanical means in removing step 112. After removal, the hulls and hypocotyls are separated from the bean pieces in a counter-current air stream in separating step 114. After separation, the hulls and hypocotyls, small pieces of cotyledons and hypocotyls are separated from the hulls in a separating step 116. Recovered small pieces of cotyledons and hypocotyls are flaked in a flaking step 118. Recovered hulls and remaining hypocotyls are ground in a grinding step 120. Finally, the ground hulls and hypocotyls or mill run solids have been processed into animal feed in a packaging step 122.

Phase 2: Small Pilot Plant Extractions

The lab procedures were then scaled-up in a series of three small pilot plant-scale runs using 1.8 kg of the commercial hull and hypocotyl mixture each time. This is an intermediate step in the scale-up process and was 30 times larger than the laboratory scale. The starting material was washed twice with 30 L ambient temperature water. After each washing the solids were separated from the dirty wash water using a Langenkamp finisher, model 185SG. The material was then soaked for 18 hours in 30 L of ambient temperature water after adjusting the pH to 2.4 with nitric acid. The pectinaceous materials were extracted in a steam-jacketed kettle with rapid stirring at 90° C. and pH 1.8 for 45 minutes. The pectin liquor was separated from the spent hulls using mechanical pressing through press cloths. After mechanical pressing, the pectin liquor can be ultra filtered to a liquid concentration of 0.5 to 3–5%. After precipitation in 2×volumes of 100% 2-propanol, three rinses in 70% and 100% 2-propanol and drying, approximately 50 g of the pectinaceous material from the third run was analyzed by Danisco-Cultor, Brabrand, Denmark for chemical composition.

Referring now to FIG. 2, an block diagram 200 for another preferred embodiment of a process of this invention is shown to includes a start step 202 where a 1800 gram soy hull and hypocotyl sample starts its way through the purification and whitening process of this invention. The hull and hypocotyl sample is washed until % T (turbidity) is less than about 35% in a washing step 204. After washing, the sample is soaked in room temperature water adjusted to a pH of about 2.4 in a soaking step 206. Next, the sample is extracted at a pH of about 1.8 for about 45 minutes with agitation at a temperature of about 90° C. in an extracting step 208. After extracting, the extracted sample is cooled to about 55° C. and the pH is adjusted to about 4.2 with sodium carbonate in a cooling step 210. Next, a liquid component of the cooled sample is separated using mechanical press cloth in a separating step 212. It should be recognized that any liquid separating apparatus can be used provided the apparatus does not result in the decomposition of the pectinaceous material. After separation, the liquid can be concentrated in an ultra filtration step 214; although, preferred, the step can be omitted. After ultra filtration, the liquid is precipitated in 2 volumes of 2-propanol in a precipitating step 216. After precipitation, the solids are washed three times with 70% propanol and 2 times with 100% 2-propanol with mechanical pressing between each wash in a washing step 218. Although 2-propanol is preferred other alcohols can be used preferably primary and secondary alcohols having between about 2 and about 10 carbon atoms. After washing, remaining alcohol is allowed to evaporated over a period of time and then the solids are dried in vacuum at about 50° C. for about 18 hours in an evaporating/drying step 220. Next, the dried solids are ground to pass through a 20 mesh screen in a grinding step 222. After grinding, the solids are stored under dry conditions for evaluation in a storing step 224. Of course, that this point, the solid can be used to prepare any food stuff that uses pectin. Thus, the present invention also relates to any food stuff containing the soy pectin of this invention.

Phase 3: Large Scale Pilot Plant Tests

Based on the small scale extractions, a series of four large-scale pilot plant extractions was performed on 9 kg of the hull and hypocotyl mixture that was washed, soaked and extracted in 80 L of water at 90° C. and pH 1.8 for 45 min. An overhead mixer, Lightning (Avon, N.Y.), was used to provide continuous agitation during the extraction to aid in acid penetration and removal of pectin from the hulls. An extraction of this size prohibited the use of batch filtration, so preliminary tests were run to determine the operating parameters for a pilot plant-scale, continuous, solid bowl centrifuge (Derrick Corporation, Buffalo, N.Y. 14225). The pilot-plant scale centrifuge was loaned to us by Derrick Corporation whose employees worked with us to refine the separation techniques and the centrifuge operating conditions.

Figure 3:
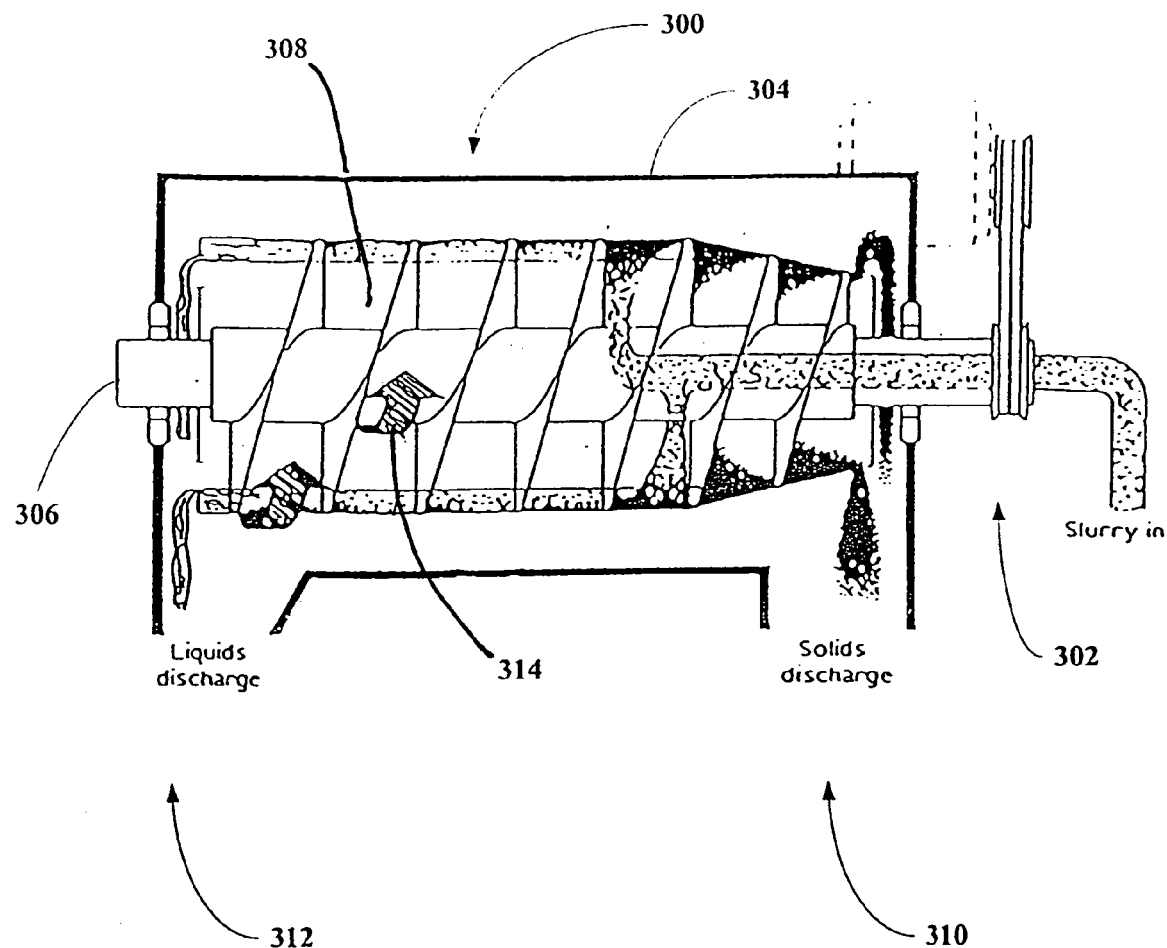
FIG. 3 depicts a cross-section of pilot plant-scale, continuous, solid bowl centrifuge.

This solid bowl centrifuge has one drive mechanism for the bowl and a separate drive mechanism that turns a conveyer to remove the solids from inside the bowl as shown in FIG. 3. Looking at FIG. 3, a preferred centrifuge unit 300 for use in the practice of this invention is shown to include a slurry inlet 302, a housing 304, a screw 306, a plurality of flights 308, a solid discharge 310 and a liquids discharge 312. The screw 306 is shown to turn in a direction shown in arrow 314.

The solid bowl centrifuge speed of 5,000 rpm (3750 RCF) was found to be sufficient to remove most of the fine materials remaining after the extraction. The conveyer was run at 3,100 rpm in the direction opposite to the bowl to give a net speed of 20 rpm conveying the solids out of the bowl. The tapered, conical end of the centrifuge acts like an inclined plane where the solids are drained as they are conveyed up and out of the centrifuge. The solids content of the feed and stream that had been centrifuged was determined using a Beckman model TJ-6 centrifuge (Fullerton, Calif. 92835).

The pectinaceous material was precipitated in 2× volumes of 100% 2-propanol overnight and washed with 70% and 100% 2-propanol (FIG. 4). The removal of the alcohol solution and rinse solutions was accomplished with press clothes. Approximately 800 g of this product was analyzed for functionality and applications.

In this feasibility study, the inventors also explored how economically the soy hulls and hypocotyls remains could be disposed after extracting the pectin. Composite samples of the soy hulls and hypocotyls were analyzed to determine if the extracted soy hulls could still be used as an energy source for ruminants. Samples were dried at 55° C. in a forced air oven for 18 hours to determine the moisture content prior to grinding. A representative sample was dried at 100° C. in a convection oven for 18 hours to determine the dry matter content. All of the analysis are reported on a dry matter, bone-dry-basis. Composite samples of the starting materials and extracted soy hulls and hypocotyls were analyzed for neutral detergent fiber (NDF), acid detergent fiber (ADF) and acid detergent lignin (ADL) using a modification of the Van Soest procedure (Goering and Van Soest 1970) with the filter bag technique (Ankom[200] Fiber Analyser: Ankom Technology Corporation, Fairport, N.Y.). Samples were also analyzed for in vitro digestibility IVDMD by the method of Tilley and Terry 1963. Dry matter, ash and crude protein as Kjeldahl nitrogen were run by the AOAC 1984 method and tannin content was analyzed by the procedure of Burns 1971 as modified by Price et al. 1978. Mineral analysis was performed by inductively coupled plasma (Spectro Analytical Instruments, Spectro Flame Module E).

Referring now to FIG. 4, an block diagram 400 for another preferred embodiment of a process of this invention is shown to includes a start step 402 where a 9 kilogram soy hull and hypocotyl sample starts its way through the purification and whitening process of this invention. The hull and hypocotyl sample is washed and drained 4 times in 200 L of water in a washing step 404. Of course, additional washed can be used as well. Moreover, less washes can be used, but the resulting process is less preferred. After washing, the sample is soaked in room temperature water adjusted to a pH of about 2.4 in a soaking step 406. Next, the sample is extracted at a pH of about 1.8 for about 45 minutes with agitation at a temperature of about 90° C. in an extracting step 408. After extracting, the extracted sample is cooled to about 70° C. and the pH is adjusted to about 4.2 in a cooling step 410. Next, a liquid component of the cooled sample is separated using a centrifuge @3750 RCS at a flow rate of about 9.5 L/min in a separating step 412. It should be recognized that any liquid separating apparatus can be used, provided the apparatus does not result in the decomposition of the pectinaceous material. After separation, yielded about 82 L of a crude pectin liquor and about 22 kgs of extracted solids in recovering step 414; although, preferred, the step can be omitted. Next, the liquid is precipitated into 2-propanol with agitation and held in the precipitating environment for about 18 hours in a precipitating step 416. After precipitation, the solids are washed three times with 70% propanol and 2 times with 100% 2-propanol with mechanical pressing between each wash in a washing step 418. Although 2-propanol is preferred other alcohols can be used preferably primary and secondary alcohols having between about 2 and about 10 carbon atoms. After washing, remaining alcohol is allowed to evaporated over a period of about 48 hours ate room or ambient temperature and then dried under vacuum at about 50° C. for about 18 hours in an evaporating/drying step 420. This process afforded 511 grams of a pectaneous material, a yield of about 5.6% in a recovering step 422. Of course, that this point, the solid can be used to prepare any food stuff that uses pectin. Thus, the present invention also relates to any food stuff containing the soy pectin of this invention.

Although several preferred processes of this invention are described above, it should be recognized that the times and temperatures set forth in these embodiments are preferred times and temperatures and shorter and longer times are permitted as well as high and lower temperatures are permitted.

REFERENCES

Adler-Nissen, J. L., Gurtler, H., Olsen, H. A. S., Schulein, M. Jensen, G. W. and Rijsgaard, S. 1984. *UK Patent Application*, GB 2115820 A.

Americal Soybean Association, 1998. 1998 Soy Status Reference Guide. http://www.ag.uiuc.edu/~stratsoy/98soystats.

Andersson, T. 1994. Functional properties lead to healthier snacks with sugar beet fiber. Food Tech. Europe 11:124, 126.

AOAC. 1984. Official Methods of Analysis, 14$^{th}$ Ed. Association of Official Analytical Chemists, Washington, D.C.

Beldman, G., van den Broek, L. A. M., Schols, H. A., Searle-van Lecuwen, M. J. F., van Laere, K. M. J. and Voragen, A. G. J. 1996. An exogalacturonase from *Aspergillus aculetus* able to degrade xylogalacturonan. Biotech. Letters. 18(6):707–712.

Burns, R. E. 1971. Methods for estimation of tannin in grain sorghum. Agron. J. 63: 611. Crandall, P. G., Braddock, R. J. and Rouse, A. H. 1978. Effect of drying on pectin made from lime and lemon pomace. J. of Food Sci. 43(6): 1680–1682.

Dalev, P. G. and Simeonova, L. S. 1995. Emulsifying properties of protein-pectin complexes and their use in oil-containing foodstuffs. J. Sci. Food Agric. 68:203–206.

Ehrlich, R. M. 1998. Personal Communications. Anahein, Calif. 92801.

Garcia, R., Arriola, D., de Arriola, M. C., de Porres, E. and Rolz, C. 1991. Characterization of Coffee Pectin. Lebensm.-Wiss.u.-Technol. 24:125–129.

Glicksman, M. 1991. Hydrocolloids and the Search for the "Oily Grail." Food Tech. 45(10):94–103.

Glore, S. R., VanTreeck, D. Knehans, A. W. and Guild, M. 1994. Soluble fiber and serum lipids: a literature review. J. Am. Dietetic Assoc. 94(4):425–436.

Goering, H. K. and Van Soest, P. J. 1970. Forage fiber analysis, apparatus, reagents, procedures and some applications. Agricultural Handbook No.379. ARS, USDA, Washington, D.C.

Gnanasambandam, R. and Proctor, A. 1999. Preparation of soy hull pectin. Food Chemistry 65:461–467.

Hunninghake, D. B., Miller, V. T., LaRosa, J. C., Kinosian, B., Brown, V., Howard, W. J., Diserio, F. J. and O'Connor, R. R. 1994. Hypocholesterolemic effects of a dietary fiber supplement. Am. J. Clin. Nutr. 59:1050–1054.

IFT Committee. 1959. Pectin standardization: Final report of the IFT Committee. Food Technol. 13:496–500.

Jeltema, M. A. and Zabik, M. E. 1980. Revised method for quantitating dietary fiber components. J.Sci. Food Ag. 31:820–829.

Judd, P. A. and Truswell, A. S. 1982. Comparison of the effects of high- and low-methoxyl pectin on blood and faecal lipids in man. Br. J. Nutrition 48:451–458.

Kester, J. J., and Fennema, O. R. 1986. Edible Films and Coatings: A Review. Food Tech. 40(12):47–58.

Kintner, P. K. and VanBuren, J. P. 1982. Carbonhydrate interference and its correction in pectin analysis using the m-hydroxydiphenyl method. J. of Food Sci. 47:756–759, 764.

Klugh Jr., B. F. 1997. Arkansas Agricultural Statistics for 1997. Cooperative Extension Service, Little Rock, Ark.

Kumar, G. P., Sudheesh, S., Ushakumari, B., Valsa, A. K., Vijayakumar, S., Sandhya, C., and Vijayalakshmi, N. R. 1997. A comparative study on the hypolipidemic activity of eleven different pectins. Food Sci. Technol. 34(2): 103–107.

Lui, K. S. 1997. Agronomic characteristics, production and marketing. Ch. 1 in *Soybeans, Chemistry, Technology and Utilization*. K. S. Lui (Ed), p. 1–26. Chapman & Hall, New York. May, C. D. 1990. Industrial pectins: sources, production and applications. Carbohydrate Polymers 12:79–99.

Olsen, A. G. and Stuewer, R. 1938. Method of preparing pectin. U.S. Pat. No. 2,132,577.

Price, M. L., VanScovoc, S. and Butler, L. G. 1978. A critical evaluation of the vanillin reaction as an assay for tannin in sorghum grain. J. Agric. Food Chem. 26:1214.

Pszczola, D. E. 1998. Fiber has a strong supporting role in nutraceutical movement. Food Tech. 52(7):90, 92, 94 and 96.

Thestrup, N. 1993. The new potential of pectin. Food Manufacture (9):55.

Tilley, J. M. A. and Terry, R. A. 1963. A two stage technique for the in vitro digestion of forage crops. J. Grassl. Soc. 18:104–111.

Weightman, R. M. Renard, C. M. G. C. and Thibault, J-F. 1994. Structure and properties of the polysaccharides from pea hulls. Part 1: chemical extraction and fractionation of the polysaccharides. Carbohydrate Polymers. 24:139–148.

Weightman, R. M. Renard, C. M. G. C., Gallant, D. J. and Thibault, J-F. 1995. Structure and properties of the polysaccharides from pea hulls. Part II. Modification of the composition and physico-chemical properties of pea hulls by chemical extraction of the constituent polysaccharides. Carbohydrate Polymers. 26:121–128.

Yamaguchi, F., Shinizu, N. and Hatanaka, C. 1994. Preparation and physiological effect of low-molecular-weight pectin. Biosci. Biotech. Biochem. 58(4)679–682.

All references cited herein are incorporated by reference. While this invention has been described fully and completely, it should be understood that, within the scope of the appended claims, the invention may be practiced otherwise than as specifically described. Although the invention has been disclosed with reference to its preferred embodiments, from reading this description those of skill in the art may appreciate changes and modification that may be made which do not depart from the scope and spirit of the invention as described above and claimed hereafter.

We claim:

1. A method for producing soy pectin comprising the steps of:
   extracting a soybean hull/hypocotyl mixture in a mineral acid at an elevated temperature and for a time and at a pH sufficient to form a pectinaceous soy material from the mixture;
   cooling the pectinaceous soy material while raising the pH of the pectinaceous soy material;
   separating a soluble pectinaceous soy material from an insoluble residue;
   precipitating the soluble pectinaceous soy material in an alcohol to form a precipitated pectinaceous soy material; and
   drying the precipitated pectinaceous soy material to form a soy pectin.

2. The method of claim 1, further comprising the step of:
   pre-washing the soybean hull/hypocotyl mixture in the presence of a solvent for a time and temperature sufficient for a liquid fraction of the mixture to obtain a percent transmittance of above about 35%.

3. The method of claim 2, further comprising the step of:
   after pre-washing, soaking the soybean hull/hypocotyl mixture in the presence of a solvent for a time, temperature and pH sufficient to expand and the cellular matrix of the soybean hull/hypocotyl mixture.

4. The method of claim 1, further comprising the step of:
   post-washing the precipitated pectinaceous soy material with pressing in the presence of a solvent a sufficient number of times to form a washed precipitated pectinaceous soy material.

5. The method of claim 4, wherein the post-washing step comprising:
   washing the precipitated pectinaceous soy material at least three times with a 70% 2-propanol aqueous solution with pressing after each washing to form a first washed precipitated pectinaceous soy material; and
   washing the first washed precipitated pectinaceous soy material at least two times with 100% 2-propanol with pressing after each washing to form the washed precipitated pectinaceous soy material.

6. The method of claim 4, further comprising the step of:
   prior to drying, slowly evaporating residual 2-propanol present in the washed precipitated pectinaceous soy material for a time sufficient to enhance a whiteness of the soy pectin.

7. The method of claim 1, wherein the drying step comprises:
   evaporating residual 2-propanol from the precipitated pectinaceous soy material for a time sufficient to enhance a whiteness of the soy pectin; and
   drying the precipitated soy pectinaceous material under a vacuum at an elevated evaporation temperature.

8. The method of claim 1, further comprising the step of:
   grinding the soy pectin.

9. A method for producing soy pectin comprising the steps of:
   pre-washing a hull/hypocotyl mixture in the presence of a solvent for a time and at a temperature sufficient to produce a pre-washed hull/hypocotyl mixture, where a liquid fraction thereof has a percent transmittance above about 35%;
   extracting the pre-washed hull/hypocotyl mixture in a mineral acid at an elevated temperature for a time and at a pH sufficient to form a soy pectinaceous-containing mixture;
   cooling the soy pectinaceous-containing mixture while raising the pH;
   separating a soluble soy pectinaceous material from an insoluble residue;
   precipitating the soluble soy pectinaceous material in an alcohol to form a precipitated soy pectinaceous material; and
   drying the precipitated soy pectinaceous material to form soy pectin.

10. The method of claim 9, further comprising the step of:
    soaking the pre-washed hull/hypocotyl mixture in the presence of a solvent for a time, at a temperature, and at a pH sufficient to expand the cellular matrix of the pre-washed extraction hull/hypocotyl mixture.

11. The method of claim 9, further comprising the step of:
    post-washing the precipitated soy pectinaceous material in the presence of a solvent with pressing after each post-washing a sufficient number of times to from a washed precipitated soy pectinaceous material.

12. The method of claim 11, wherein the post-washing step comprises:
    washing the precipitated soy pectinaceous material at least three times with a 70% 2-propanol aqueous solution with pressing after each washing to form a first washed precipitated soy pectinaceous material; and
    washing the first washed precipitated soy pectinaceous material at least two times with 100% 2-propanol with pressing after each washing to form the washed precipitated soy pectinaceous material.

13. The method of claim 11, further comprising the step of:
    prior to drying, slowly evaporating residual 2-propanol from the washed precipitated soy pectinaceous material for a time sufficient to enhance a whiteness of the soy pectin.

14. The method of claim 9, wherein the drying step comprises:
    slowly evaporating residual 2-propanol from the precipitated soy pectinaceous material for a time sufficient to enhance a whiteness of the soy pectin; and
    drying the precipitated soy pectinaceous material under a vacuum at an elevated evaporation temperature.

15. The method of claim 9, further comprising the step of:
after drying, grinding the soy pectin.

16. A method for producing soy pectin comprising the steps of:
pre-washing the hull/hypocotyl mixture in the presence of a solvent for a time and temperature sufficient to produce a pre-washed hull/hypocotyl mixture, where a liquid fraction thereof has a percent transmittance above about 35%;
soaking the pre-washed hull/hypocotyl mixture in the presence of a solvent for a time, at a temperature and at a pH sufficient to expand the cellular matrix of the pre-washed hull/hypocotyl mixture;
extracting the pre-washed hull/hypocotyl mixture in a mineral acid at an elevated temperature for a time and at a pH sufficient to form a soy pectinaceous-containing mixture;
cooling the soy pectinaceous-containing mixture while raising the pH;
separating a soluble soy pectinaceous material from an insoluble residue;
precipitating the soluble soy pectinaceous material in an alcohol to form a precipitated soy pectinaceous material; and
drying the precipitated soy pectinaceous material to form soy pectin.

17. The method of claim 16, further comprising the step of:
post-washing the precipitated soy pectinaceous material in the presence of a solvent with pressing after each post-washing a sufficient number of times to from a washed precipitated soy pectinaceous material.

18. The method of claim 17, wherein the post-washing step comprises:
washing the precipitated soy pectinaceous material at least three times with a 70% 2-propanol aqueous solution with pressing after each washing to form a first washed precipitated soy pectinaceous material; and
washing the first washed precipitated soy pectinaceous material at least two times with 100% 2-propanol with pressing after each washing to form the washed precipitated soy pectinaceous material.

19. The method of claim 17, further comprising the step of:
slowly evaporating residual 2-propanol from the washed precipitated soy pectinaceous material for a time sufficient to enhance a whiteness of the soy pectin.

20. The method of claim 16, wherein the drying step comprises:
slowly evaporating residual 2-propanol from the precipitated soy pectinaceous material for a time sufficient to enhance a whiteness of the soy pectin; and
drying the precipitated soy pectinaceous material under a vacuum at an elevated evaporation temperature.

21. The method of claim 16, further comprising the step of:
after drying, grinding the soy pectin.

* * * * *